US012313018B2

(12) United States Patent
Vosz et al.

(10) Patent No.: US 12,313,018 B2
(45) Date of Patent: May 27, 2025

(54) SYSTEMS AND METHODS FOR CONTROLLING A VEHICLE ENGINE

(71) Applicant: Honda Motor Co., Ltd., Tokyo (JP)

(72) Inventors: Adam H. Vosz, Delaware, OH (US); Tomoharu Hozumi, Saitama-ken (JP); Benjamin C. Schwartz, Lewis Center, OH (US); Cameron S. Daley, Canton, CT (US); Dylan P. Antonides, Marysville, OH (US); Nicholas R. Pratt, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 78 days.

(21) Appl. No.: 18/184,492

(22) Filed: Mar. 15, 2023

(65) Prior Publication Data

US 2024/0309827 A1 Sep. 19, 2024

(51) Int. Cl.

| | |
|---|---|
| ***F02D 41/38*** | (2006.01) |
| ***F02B 75/18*** | (2006.01) |
| ***F02D 41/00*** | (2006.01) |
| ***F02D 41/14*** | (2006.01) |
| ***F02D 41/30*** | (2006.01) |

(52) U.S. Cl.

CPC .............. *F02D 41/38* (2013.01); *F02B 75/18* (2013.01); *F02D 41/0087* (2013.01); *F02D 41/1454* (2013.01); *F02D 41/3017* (2013.01); *F02B 2075/1824* (2013.01)

(58) Field of Classification Search

CPC .. F02D 41/38; F02D 41/0087; F02D 41/1454; F02D 41/3017; F02B 75/18; F02B 2075/1824

See application file for complete search history.

(56) References Cited

U.S. PATENT DOCUMENTS

| | | | | |
|---|---|---|---|---|
| 5,335,539 A * | 8/1994 | Sweppy | F02D 41/1495 73/114.73 |
| 5,394,691 A | 3/1995 | Seki | |
| 7,171,960 B1 * | 2/2007 | Hagari | F02M 25/0827 123/472 |
| 9,188,072 B2 | 11/2015 | Tomimatsu et al. | |
| 9,835,097 B1 * | 12/2017 | Schrewe | F02D 41/0002 |

(Continued)

FOREIGN PATENT DOCUMENTS

EP 1772610 B1 12/2013

*Primary Examiner* — Kurt Philip Liethen

(74) *Attorney, Agent, or Firm* — Armstrong Teasdale LLP

(57) ABSTRACT

Provided herein is a control system for a vehicle. The control system includes an engine including cylinders, each of the cylinders including a fuel injector associated therewith, a vehicle exhaust system coupled in fluid communication with the engine for receiving exhaust gas therefrom, a sensor coupled to the vehicle exhaust system to detect an air-to-fuel ratio of the exhaust gas, and an engine electronic control unit (ECU) communicatively coupled to the sensor and the fuel injector of each cylinder, the ECU including memory and a processor. The ECU is configured to store a sequence of operating states of the cylinders, determine, based on the stored sequence of operating states, expected air-to-fuel ratio (ATFR) value data, receive, from the sensor, actual air-to-fuel ratio (ATFR) value data, determine a difference between the expected and actual ATFR value data, and control operation of the fuel injector based on the determined difference.

20 Claims, 8 Drawing Sheets

(56) References Cited

U.S. PATENT DOCUMENTS

| | | | | |
|---|---|---|---|---|
| 10,337,430 | B2 | 7/2019 | Jammoussi et al. | |
| 2003/0154953 | A1 * | 8/2003 | Yasui | F02D 41/2454 123/205 |
| 2011/0307158 | A1 * | 12/2011 | Imamura | F02P 11/00 701/102 |
| 2012/0035831 | A1 * | 2/2012 | Kidokoro | F02D 41/0085 701/104 |
| 2016/0131072 | A1 * | 5/2016 | Surnilla | F02D 41/221 701/107 |

* cited by examiner

700

| | Cylinder On | Fuel Cut | Cylinder Stop |
|---|---|---|---|
| Air In | ○ | ○ | X |
| Exhaust Out | ○ | X | X |
| Fuel Injected | ○ | X | X |
| LAF Sensor | CATFR | Minimum | Min <= LAF <= KCMD |

SYSTEMS AND METHODS FOR CONTROLLING A VEHICLE ENGINE

FIELD

The field of the disclosure relates generally to systems and methods for controlling a vehicle engine and, more specifically, to systems and methods for improved air-to-fuel ratio control in vehicle engines.

BACKGROUND

Exhaust emission control devices, or catalytic converters, are an integral part of exhaust systems of gasoline-powered automobiles. A catalytic converter essentially reduces undesirable gas emissions including, but not limited to, carbon monoxide, unburnt hydrocarbons and soluble organic fractions. Typically, an automotive catalytic converter includes metallic catalysts, usually precious metals, such as platinum (Pt), palladium (Pd), and rhodium (Rh). In many cases, emission reduction in the automotive industry can be realized by increasing the mass of a catalytic converter's precious metals. However, this option is undesirable due to the rarity of the metals and because of how prohibitively expensive they can be. Operating a gasoline-powered engine at an air-to-fuel ratio that is too rich or too lean can result in excessive or inefficient use of the precious metals within a catalytic converter.

BRIEF DESCRIPTION

In one aspect, a control system for a vehicle is provided. The control system includes an engine comprising one or more cylinders, each of the one or more cylinders including at least one fuel injector associated therewith, a vehicle exhaust system coupled in fluid communication with the engine for receiving exhaust gas therefrom, at least one sensor coupled to the vehicle exhaust system to detect an air-to-fuel ratio of the exhaust gas, and an engine electronic control unit (ECU) communicatively coupled to the at least one sensor and the at least one fuel injector of each cylinder, the ECU comprising memory and at least one processor. The ECU is configured to store a sequence of operating states of the one or more cylinders, determine, based on the stored sequence of operating states, expected air-to-fuel ratio (ATFR) value data, receive, from the at least one sensor, actual air-to-fuel ratio (ATFR) value data, determine a difference between the expected and actual ATFR value data, and control operation of the at least one fuel injector based on the determined difference.

In another aspect, a method of controlling a vehicle engine including one or more cylinders, each of the one or more cylinders including at least one fuel injector associated therewith is provided. The method includes storing, in a memory of an engine electronic control unit (ECU), a sequence of operating states of the one or more cylinders, determining, by the ECU, expected air-to-fuel ratio (ATFR) value data based on the stored sequence of operating states, receiving, at the ECU, actual air-to-fuel ratio (ATFR) value data from at least one sensor of an exhaust system of the vehicle, determining, by the ECU, a difference between the expected and actual ATFR value data, and controlling, using the ECU, operation of the at least one fuel injector of the one or more cylinders based on the determined difference.

In yet another aspect, an engine electronic control unit (ECU) comprising memory and at least one processor is provided. The memory has computer-executable instructions embodied thereon which, when executed by the at least one processor, cause the at least one processor to store a sequence of operating states of one or more cylinders of an engine, wherein each of the one or more cylinders includes at least one fuel injector associated therewith, determine, based on the stored sequence of operating states, expected air-to-fuel ratio (ATFR) value data, receive, from at least one sensor of a vehicle exhaust system, actual air-to-fuel ratio (ATFR) value data, determine a difference between the expected and actual ATFR value data, and control operation of the at least one fuel injector based on the determined difference.

DETAILED DESCRIPTION

Figure 1:
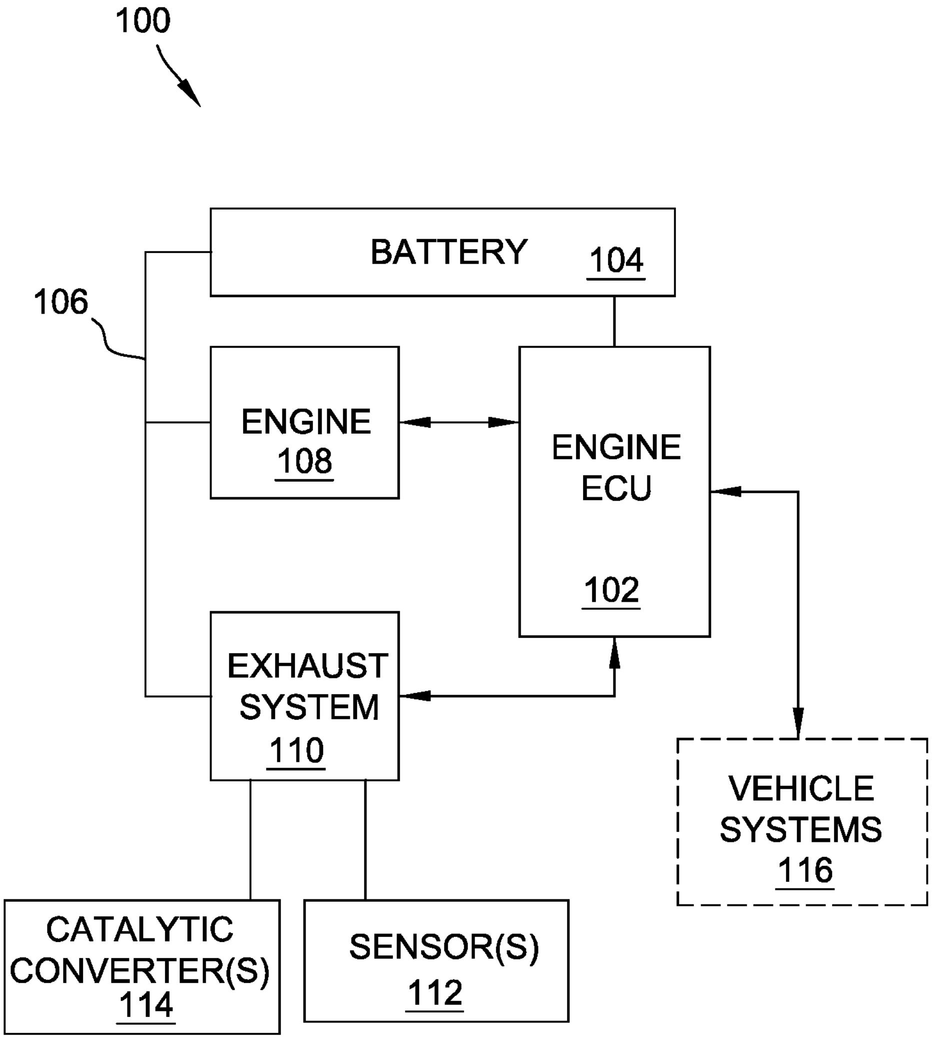
FIG. 1 is a block diagram of an exemplary control system for controlling a vehicle engine.

Embodiments of the systems described herein include an engine electronic control unit (ECU) for a vehicle, such as an automobile. The engine ECU controls, for example, operation of a vehicle's engine, such as a combustion engine. Further, the engine ECU controls operation of an engine to improve utilization of precious metals within a catalytic converter. For example, embodiments of the engine ECUs disclosed herein control the engine (e.g., the fuel injector) to reduce the difference or fluctuations in the difference between a target air-to-fuel ratio (ATFR) value and an actual ATFR value. In some embodiments, a smith compensator model may be utilized for a linear air-to-fuel (LAF) ratio sensor to reduce ATFR to a determined target value. Tailpipe emissions may be improved, or reduced, using engine control software. Accordingly, embodiments of the engine ECU described herein avoid the need to increase precious metals mass in a catalytic converter by reducing fluctuations between the target and actual air-to-fuel ratio values of an engine and exhaust system.

In some embodiments, the engine ECU is programmed to correctly compensate for cylinder stop operations of one or more cylinders of the engine in controlling the engine to achieve a target ATFR value. In a cylinder-stop state, the valvetrain system of the associated cylinder is disabled and exhaust gases are allowed to stagnate around a linear air-to-fuel ratio (LAF) sensor, which is different from a typical fuel cut state (in which gases continue to flow through the cylinder and exhaust system, but no fuel is injected) or a cylinder-on state (in which the cylinder operates normally). Engine ECUs of the present disclosure are programmed to account for the differences in gas flow around the LAF sensor resulting from cylinder stop operations, for example, by storing expected or simulated ATFR values or curves associated with different sequences of cylinder operating states that include or follow one or more cylinder-stop states or operations.

Embodiments of the systems described herein include an engine electronic control unit (ECU) for a vehicle, such as an automobile, having an internal combustion engine. An ECU may control electronic features of a vehicle, such as cabin temperature, entertainment systems, cabin lights, braking systems and suspension systems. The ECU may also control multiple aspects of an engine, such as ignition time, starting and stopping the engine, air-to-fuel ratio control, valve control, or the like. Alternatively, an ECU may be referred to as an engine control module (ECM) or an electronic engine management system (EEMS). Additionally, or alternatively, an ECU may include, or be divided into, multiple control modules including, but not limited to, an engine control module, a brake control module, a transmission control module, a telematic control module, and a suspension control module. A vehicle may include a single ECU to control all electronic systems. Alternatively, a vehicle may have multiple ECUs, each assigned to one or more electronic systems.

In an exemplary embodiment, an engine ECU for a vehicle provides commands to electronic systems of the vehicle to manage and control elements of the electronic systems. Electronic systems typically include, but are not limited to, one or more sensors that may be equipped to provide feedback data to the engine ECU. In response, the engine ECU issues one or more commands to control elements of the electronic systems to improve operational efficiency of the vehicle, such as one or more fuel injectors of the vehicle engine.

FIG. 1 is a block diagram of an exemplary engine control system 100 for a vehicle. Engine control system 100 includes an engine electronic control unit (ECU) 102 coupled to a battery 104, an engine 108, and an exhaust system 110. Battery 104 may be a conventional car battery providing, for example, 12 Volts direct current (VDC). In alternative embodiments, battery 104 may be substituted for a fuel cell or other energy storage device suitable for operating the vehicle. ECU 102 sends and receives signals from multiple components and systems within the engine control system 100. Engine ECU 102 receives data from one or more sensors, such as sensors 112 in conjunction with one or more catalytic converters 114 of the exhaust system 110. Sensors 112 include, for example and without limitation, oxygen ($O_2$) sensors, linear air-to-fuel ratio (LAF) sensors, and combinations thereof. Engine control system 100 also includes one or more catalytic converters (CATs) 114 in accordance with the type of vehicle exhaust system, such as a dual exhaust, for example. While a single ECU 102 is shown for illustrative purposes, it is understood that system 100 may include multiple ECUs 102.

Battery 104 supplies power (e.g., DC voltage) to various components of the vehicle over a bus 106 (e.g., DC bus), which may include one or more positive conductors and one or more negative conductors. Battery 104 may supply DC voltage to various components of the vehicle including, for example and without limitation, to engine ECU 102, to engine 108 or components thereof (e.g., spark plugs, electrically-actuated valves, etc.), exhaust system 110, and one or more components of exhaust system 110. Battery 104 may also supply DC voltage to one or more other vehicle systems 116. The other vehicle systems may exchange various discrete inputs and outputs with ECU 102 or carry out various other communications with ECU 102. For example, the other vehicle systems 116 may include, but are not limited to, lights, infotainment components, a fuel injection system, a brake controller, or an ignition switch.

Figure 2:
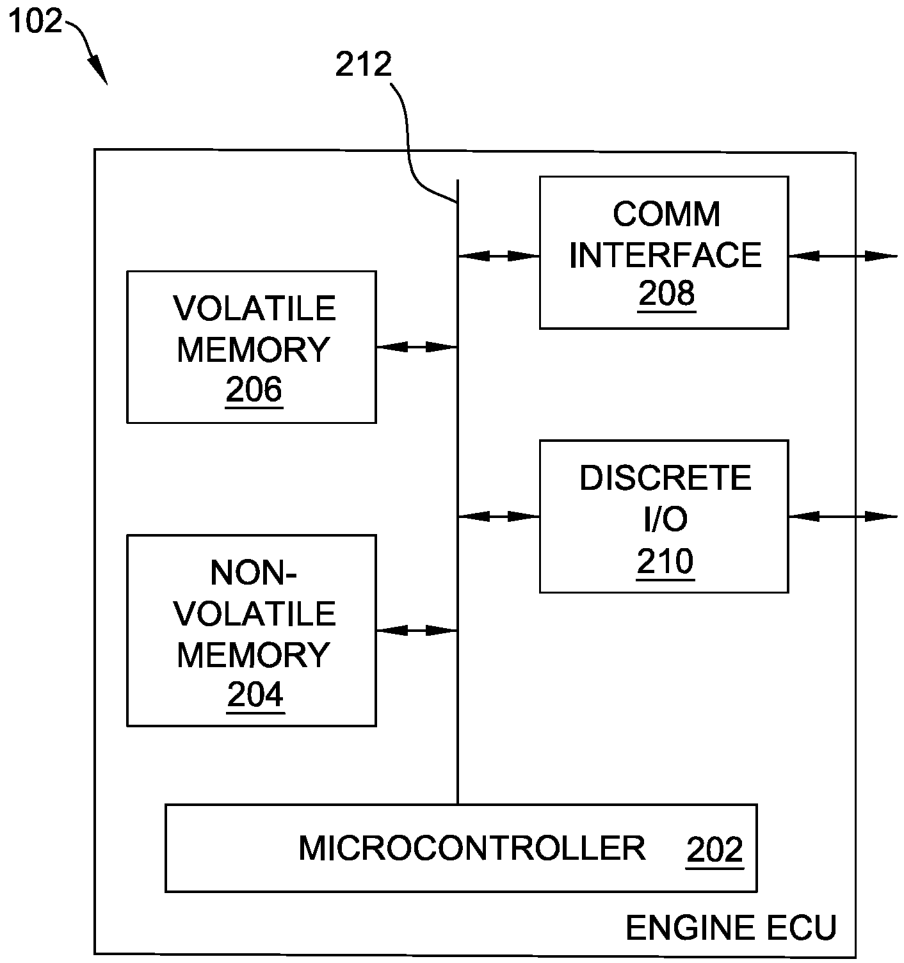
FIG. 2 is a block diagram of an exemplary engine ECU suitable for use in the control system of FIG. 1.

FIG. 2 is a block diagram of an exemplary engine ECU 102 suitable for use with the control system 100 of FIG. 1. Engine ECU 102 includes at least one processor 202 communicatively coupled to a non-volatile memory 204, a volatile memory 206, a communication interface 208, and discrete input and output (I/O) channels 210 via a data bus 212. In the illustrated embodiment, processor 202 is implemented as a microcontroller, although processor 202 may be implemented as a processor or controller other than a microcontroller. Data bus 212 includes, but is not limited to, any suitable data communication channel, such as $I^2C$, SPI, universal asynchronous receiver-transmitter (UART), universal synchronous and asynchronous receiver-transmitter (USART), a parallel bus, a serial bus, or other electrical channel, or a suitable optical channel for enabling communication among the components of engine ECU 102 and, in certain embodiments, peripheral components external to engine ECU 102. Likewise, communication interface 208 may be configured to enable communication among engine ECU 102 and one or more external devices, including for example, other ECUs, using one or more suitable communication media, formats, and protocols, such as, for example, Ethernet, USB, IEEE 1394, RS232, CAN, or MOST. In some embodiments, communication interface 208 may further enable wireless communication channels such as WiFi®, Bluetooth®, Zigbee®, or the like.

Volatile memory 206 may include one or more allocations of, for example, RAM. In alternative embodiments, additional volatile memory may be incorporated into microcontroller 202 itself. Further, in alternative embodiments, volatile memory 206 may be omitted. Non-volatile memory includes one or more allocations of mass storage space, non-volatile RAM (NVRAM), or other suitable non-volatile storage. Non-volatile memory 204 and/or volatile memory 206 may be configured to store different datasets including, for example and without limitation, cylinder operating states and sequences thereof, air-to-fuel ratio sensor data readings, desired or target air-to-fuel ratio sensor data, simulated or expected air-to-fuel ratio sensor data readings (e.g., based on cylinder operating states or sequences of cylinder operating states), air-to-fuel ratio fluctuation data, and sensor response time delay values. Sensor response time delay values may include, for example and without limitation, dead time delay, exhaust open delay, and gas transport delay, as described further herein.

Discrete I/O channels 210 are configured to transmit and receive various I/O signals 214, including, for example and without limitation, air-to-fuel ratio sensor readings, and engine operation control commands, such as valve (e.g., fuel injector) actuation commands. Microcontroller 202 is configured, for example, to determine and/or store a sequence of operating states for an engine, such as engine 108, and to determine expected emissions through the exhaust system 110 (e.g., air-to-fuel ratio data) based on the sequence of cylinder operating states. Based on the expected emissions output, microcontroller 202 may transmit a signal using discrete I/O channels 210 to control operation of one or more cylinders of engine 108 (e.g., the fuel injector of each cylinder) to improve air-to-fuel ratio control of the engine 108 and reduce fluctuations in the air-to-fuel ratio through exhaust system 110.

Figure 3:
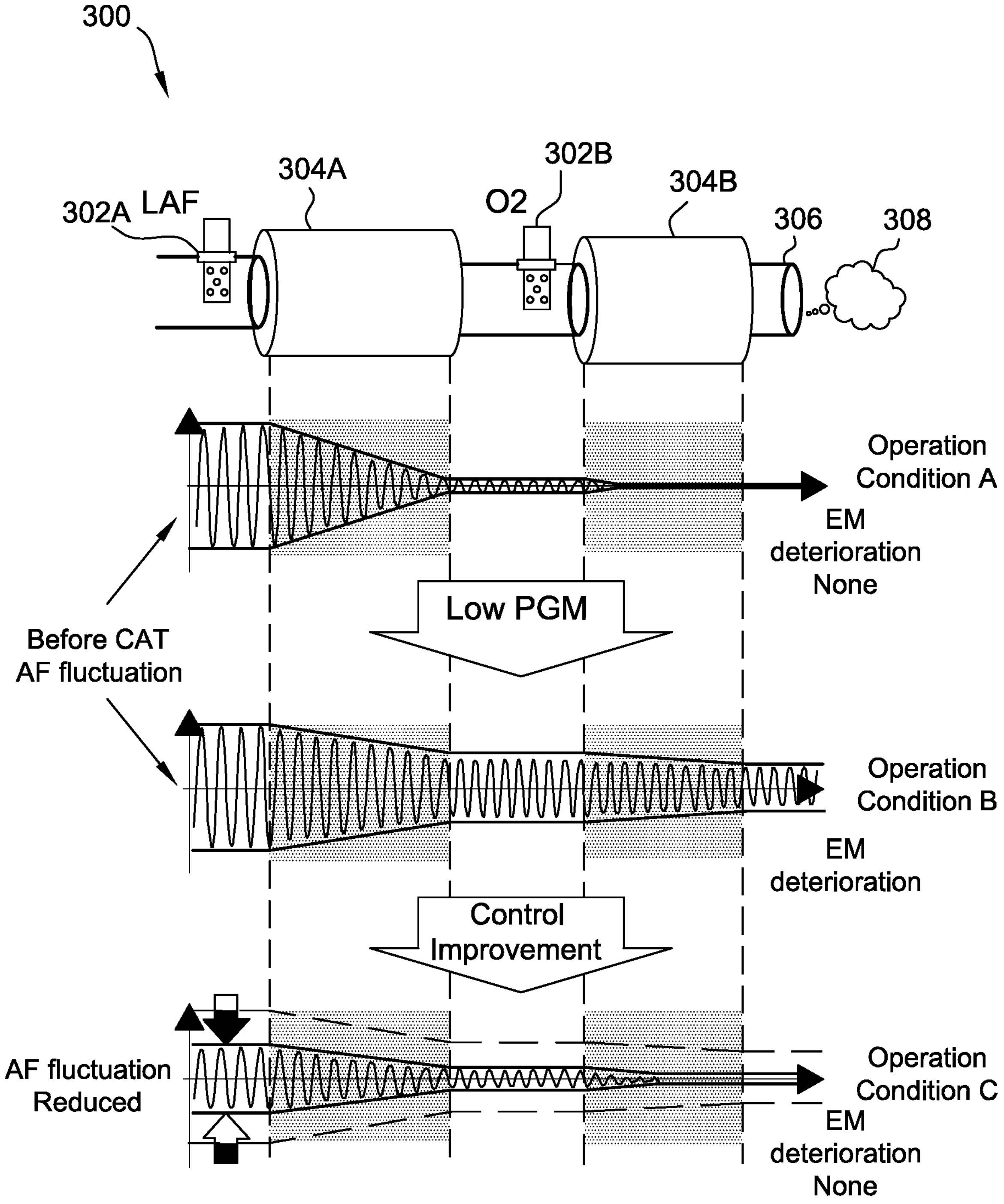
FIG. 3 is a schematic diagram of an example exhaust system illustrating gaseous exhaust flow through the exhaust system and fluctuations in the air-to-fuel (AF) ratio and emissions (EM) of the exhaust flow under different operating conditions.

FIG. 3 is a diagram of an example exhaust system 300 illustrating gaseous exhaust flow 308 through the exhaust system 300. Furthermore, FIG. 3 illustrates fluctuations in the air-to-fuel (AF) ratio and emissions (EM) of the exhaust flow 308 under three different operating conditions, first operating condition A, second operating condition B, and third operating condition C. In the example diagram, exhaust flow 308 travels from left to right (in the orientation illustrated in FIG. 3) through an exhaust pipe 306. In the example embodiment, the exhaust system 300 includes a linear air-to-fuel ratio (LAF) sensor 302A, an oxygen ($O_2$) sensor 302B, and a two-stage catalytic converter including a first catalytic converter 304A and a second catalytic converter 304B. The diagram of FIG. 3 illustrates fluctuations in the AF ratio and emissions in the exhaust flow 308 in three different scenarios: a catalytic converter system with a standard amount of precious metals (PGM) used in the catalytic converter system (first operating condition A); a catalytic converter system with a reduced amount of PGM and standard AF ratio control (second operating condition B); and a catalytic converter system with a reduced amount of PGM and improved AF ratio control according to embodiments disclosed herein (third operating condition C). As shown in FIG. 3, catalytic converters with a standard or conventional amount of PGM can effectively reduce the magnitude or amount of undesirable emissions in engine exhaust flow 308. However, when the amount of PGM in the catalytic converter is reduced, the ability of the catalytic converter to reduce undesirable emissions in engine exhaust flow 308 is also reduced resulting in emissions deterioration (EM deterioration), as illustrated in FIG. 3 (second operating condition B).

Utilizing improved engine control schemes, such as the improved air-to-fuel ratio control schemes disclosed herein, can help low-PGM catalytic converters more effectively reduce undesirable emissions in exhaust flow 308, as illustrated in the bottom chart of FIG. 3. As shown, when fluctuations in the air-to-fuel ratio of the exhaust gas flow 308 are reduced prior to reaching exhaust system 300, the mass of PGM required in the catalytic converter system is reduced. For example, embodiments of improved engine control disclosed herein include control of tailpipe or exhaust emissions using engine control software or algorithms to manipulate automotive emission cycles, such as by controlling air-to-fuel ratio in exhaust gas (e.g., exhaust gas flow 308) using a model (e.g., a smith compensator model) based on expected or simulated air-to-fuel ratio data detected by a LAF sensor. In some embodiments, fast sensor response is utilized to perform fast control response. Additionally, or alternatively, the engine control software compensates for one or more cylinder stop operations of the engine, for example, by determining the expected or simulated air-to-fuel ratio data based on past or historical sequences of cylinder operating states and/or a dead time delay associated with exhaust gas transport from the cylinder to the LAF sensor.

Figure 4:
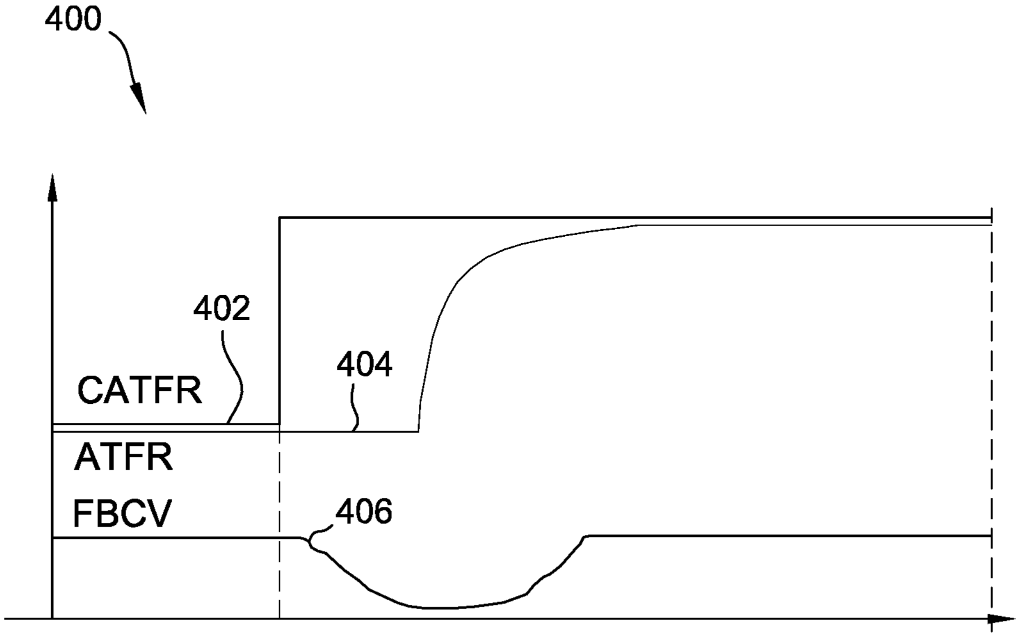
FIG. 4 is an example time plot schematically illustrating various control and sensor signals for an engine controlled according to a conventional engine control scheme.

FIG. 4 is an example time plot 400 schematically illustrating various control and sensor signals for an engine controlled according to a conventional engine control scheme. The example plot 400 represents a relatively small period of time during operation of an engine, such as 200-500 milliseconds. Plot 400 includes a commanded air-to-fuel ratio (CATFR) signal 402, an actual air-to-fuel ratio (ATFR) signal 404, and a feedback (F/B) correction value (FBCV) 406. CATFR signal 402 represents a commanded air-to-fuel ratio, and is illustrated as instantaneously changing from a low commanded air-to-fuel ratio to a high commanded air-to-fuel ratio. ATFR signal 404 represents the actual air-to-fuel ratio detected by a LAF sensor (e.g., LAF sensor 302A, shown in FIG. 3), for example, in an exhaust system of the vehicle. FBCV signal 406 represents a feedback correction factor or parameter used to control one or more fuel injectors of the vehicle engine to achieve the commanded air-to-fuel ratio. FBCV signal 406 in FIG. 4 is determined based on a difference between CATFR signal 402 and ATFR signal 404. In the illustrated plot 400, ATFR signal 404 initially remains low when CATFR signal 402 transitions from a low to high state, resulting in a relatively large dip in FBCV signal 406. Large changes in FBCV signal 406, such as the one shown in FIG. 4, generally correlate to large fluctuations in the air-to-fuel ratio of exhaust gas flow through the exhaust system, resulting in ineffective use or underutilization of PGM in the catalytic converter. For example, the control signals shown in FIG. 4 may result in the before CAT AF fluctuations illustrated in the first operating condition A and second operating condition B portions of FIG. 3.

Figure 5:
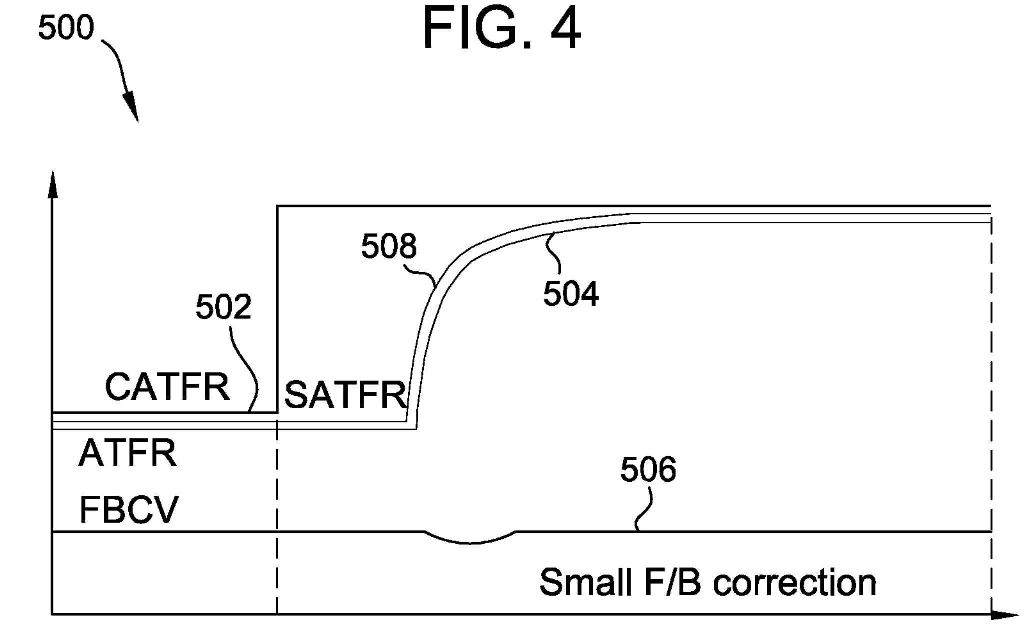
FIG. 5 is an example plot schematically illustrating various control and sensor signals for an engine controlled according to engine control schemes in accordance with the present disclosure.

FIG. 5 is an example plot 500 schematically illustrating a CATFR signal 502, an ATFR signal 504, and a FBCV signal 506 for an engine controlled according to engine control schemes disclosed herein. Plot 500 also includes a simulated or expected air-to-fuel ratio (SATFR) signal 508, which represents the expected air-to-fuel ratio detected by an LAF sensor by taking into account, for example, operating conditions of the engine, patterns of cylinder stop, desired air-to-fuel ratio values, past or historical operating states of the engine, such as operating states of engine cylinders and sequences thereof, historical LAF/$O_2$ sensor readings, and historical dead time delay calculations. In some embodiments, for example, an engine ECU (e.g., ECU 102), is configured to determine or model SATFR signal 508, for example, based on past or historical sequences of cylinder operating states and/or dead time delays associated with transport of exhaust gas from the cylinder(s) to the LAF sensor. Moreover, in the control scheme depicted in FIG. 5, FBCV signal 506 is determined (e.g., by ECU 102) based on a difference between SATFR signal 508 and ATFR signal 504, rather than the difference between CATFR signal 502 and ATFR signal 504 (as performed in the control scheme depicted in FIG. 4). Modeling the expected air-to-fuel ratio data, as depicted by SATFR signal 508 in FIG. 5, can provide a more accurate model with which to compare the actual air-to-fuel ratio data detected by the LAF sensor. As a result, differences between ATFR signal 504 and SATFR signal 508 are reduced as compared to differences between ATFR signal 504 and CATFR signal 502. Determining FBCV signal 506 based on differences between SATFR signal 508 and ATFR signal 504 can therefore produce relatively small FBCV signals 506, as shown in FIG. 5, which are used by an ECU (e.g., ECU 102) to issue operation command signals to cylinders of the engine (e.g., fuel injectors of the cylinders), and thereby facilitate reducing fluctuations in the air-to-fuel ratio of exhaust gases of the engine. Reduced fluctuations in the air-to-fuel ratio of engine exhaust gases results in better utilization of precious metals in catalytic converters, and can thereby facilitate reducing the precious metal content within catalytic converters. For example, the control signals shown in FIG. 5 may result in the before CAT AF fluctuation illustrated in the third operating condition C portion of FIG. 3.

Figures 6, 7:
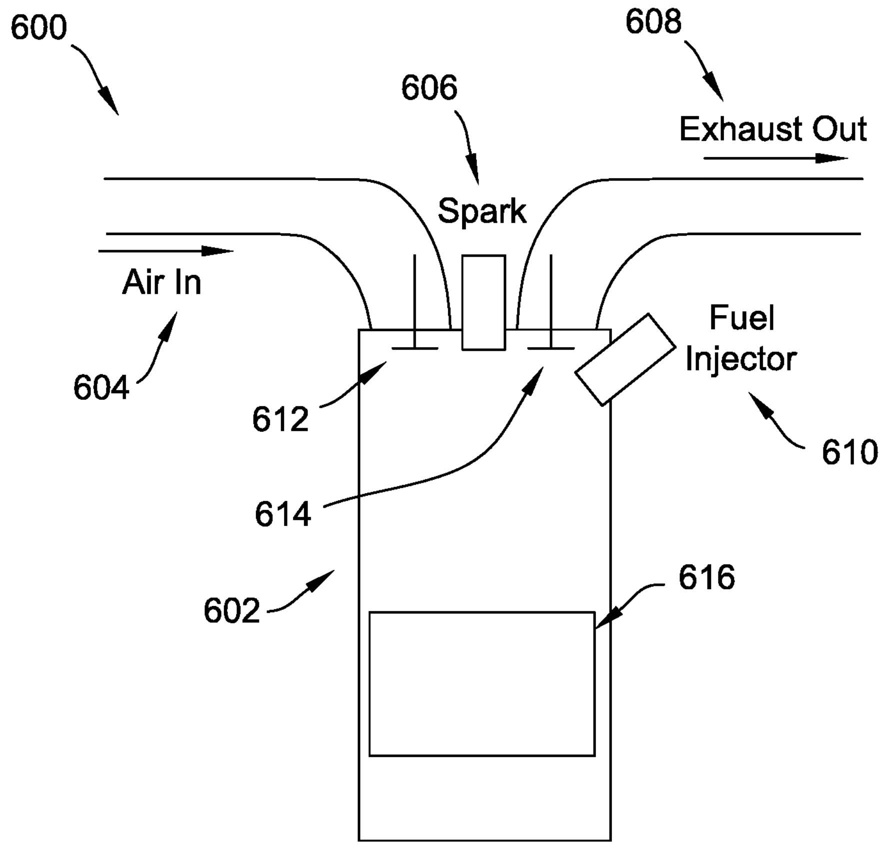
FIG. 6 is a schematic illustration of an example cylinder suitable for use with the control system of FIG. 1.
FIG. 7 is a chart depicting potential operating states of cylinders within a vehicle engine and the corresponding air flow and fuel injection characteristics in each state.

FIG. 6 is a schematic illustration of an example cylinder 602 suitable for use in the control system 100 of FIG. 1. In some embodiments, cylinder 602 is part of vehicle engine 108, shown in FIG. 1, which may include any suitable number of cylinders that enables the system 100 to function as described herein. For example, and without limitation, engine 108 may include 2 cylinders, 3 cylinders, 4 cylinders, 6 cylinders, 8 cylinders, 10 cylinders, 12 cylinders, or any other suitable number of cylinders. The cylinder 602 illustrated in FIG. 6 includes an air intake 604, an ignition source 606 (e.g., a spark plug), an exhaust outlet 608, at least one fuel injector 610, at least one intake valve 612, at least one exhaust valve 614, and a piston 616.

During operation, the cylinders of engine 108, such as cylinder 602, may be operated in one of a plurality of cylinder operating states. FIG. 7 is a chart 700 depicting three possible different operating states of cylinder 602 and the corresponding air flow and fuel injection characteristics in each state. In this embodiment, the cylinder operating states include a cylinder-on state, a fuel-cut state, and a cylinder-stop state, although other embodiments may include additional or fewer cylinder operating states. In the cylinder-on operating state, air and fuel are introduced into cylinder 602 via air intake 604 and fuel injector 610, respectively, and exhaust gas exits cylinder 602 via exhaust outlet 608 following combustion of the fuel-air mixture. While operating in the cylinder-on state, the air-to-fuel ratio detected by the LAF sensor would ideally be at the CATFR value. In the fuel-cut operating state, the piston 616 remains engaged with the vehicle drivetrain and air flows through the cylinder 602 normally via air intake 604 and exhaust outlet 608, but no fuel is injected into the cylinder 602. As a result, no exhaust gas flows out of cylinder 602, only clean or un-combusted air is expelled through the exhaust outlet 608. This operating state may correspond to a situation where a demand for torque or power from the engine (e.g., as detected by ECU 102) falls to or near zero (e.g., when a vehicle is coasting). In this operating state, air flow continues through the vehicle's exhaust system 110 and associated LAF sensor 302A, resulting in the detected air-to-fuel ratio being at a minimum value. In the cylinder-stop operating state, the piston 616 may be disengaged from the vehicle's drivetrain such that the piston 616 remains stationary within the cylinder 602. Additionally, in the cylinder-stop operating state, no fuel is injected into cylinder 602 and air flow through the cylinder 602 may cease (i.e., the air intake valve 612 and exhaust valve 614 remain closed). This operating state may correspond to a situation where the demanded torque or power output from the engine 108 (e.g., as determined by ECU 102) can be satisfied by fewer than all cylinders of the engine, and fuel savings can be realized by stopping operation of one or more of the engine's cylinders. In some embodiments, for example, the engine 108 can include a plurality of cylinder banks, where each of the cylinder banks includes a plurality of cylinders 602. The cylinders of each cylinder bank are operable in an operating state independent of the operating state of the plurality of cylinders of the other cylinder banks. For example, each cylinder within a first cylinder bank may be operated in a cylinder-on state or a fuel cut state to provide a required amount of torque or power output from the engine 108, while the cylinders within a second cylinder bank can be operated in a cylinder-stop state to reduce fuel consumption. In one particular example, the engine 108 is a six-cylinder engine, and the plurality of cylinder banks includes two-cylinder banks, each including three cylinders. In the cylinder-stop state, airflow through the vehicle's exhaust system may stop or be reduced such that exhaust gases (e.g., from previous combustion cycles of cylinder 602) stagnate around the LAF sensor. As a result, the air-to-fuel ratio value detected by the LAF sensor (e.g., LAF sensor 302A) can vary between a minimum value and a maximum value (e.g., CATFR).

When the cylinder 602 is reactivated or reengaged following a cylinder-stop state or operation, the air-to-fuel ratio detected by the LAF sensor 302A will vary based at least in part on the preceding operating states of the cylinder 602 and the associated air flow delivered to the vehicle's exhaust system 110. By way of example, the expected air-to-fuel ratio detected by the LAF sensor 302A for a cylinder that transitions directly from a cylinder-on state to a cylinder-stop state and back to a cylinder-on state will be different than the expected air-to-fuel ratio for a cylinder that sequentially transitions from a cylinder-on state, to a fuel-cut state, to a cylinder-stop state, and then to a cylinder-on state.

Figure 8A:
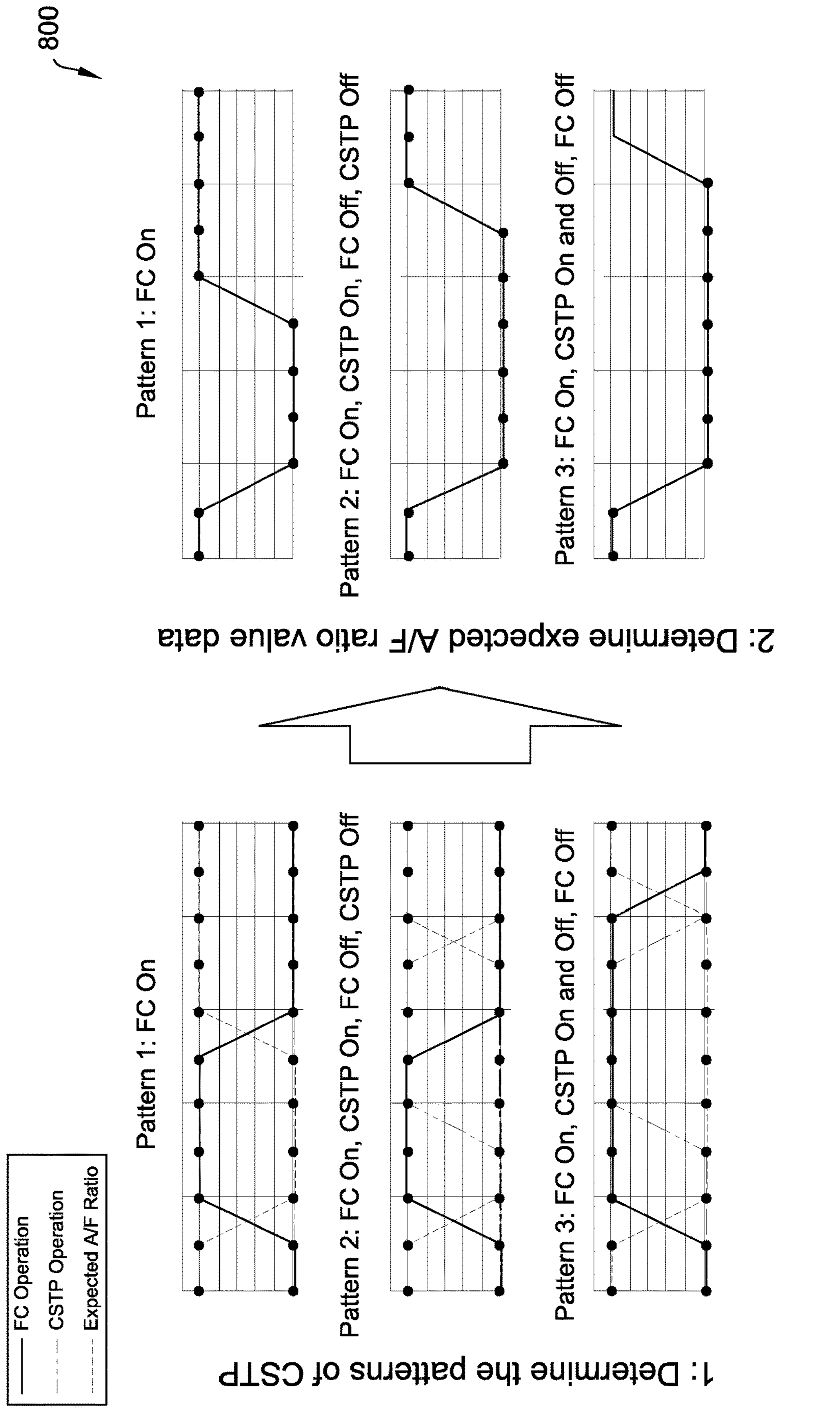
FIGS. 8A and 8B are flow diagrams of a process that may be used by an engine ECU to determine expected air-to-fuel ratio value data detected by a linear air-to-fuel ratio sensor based on past or historical sequences of cylinder operating states.
Figure 8B:
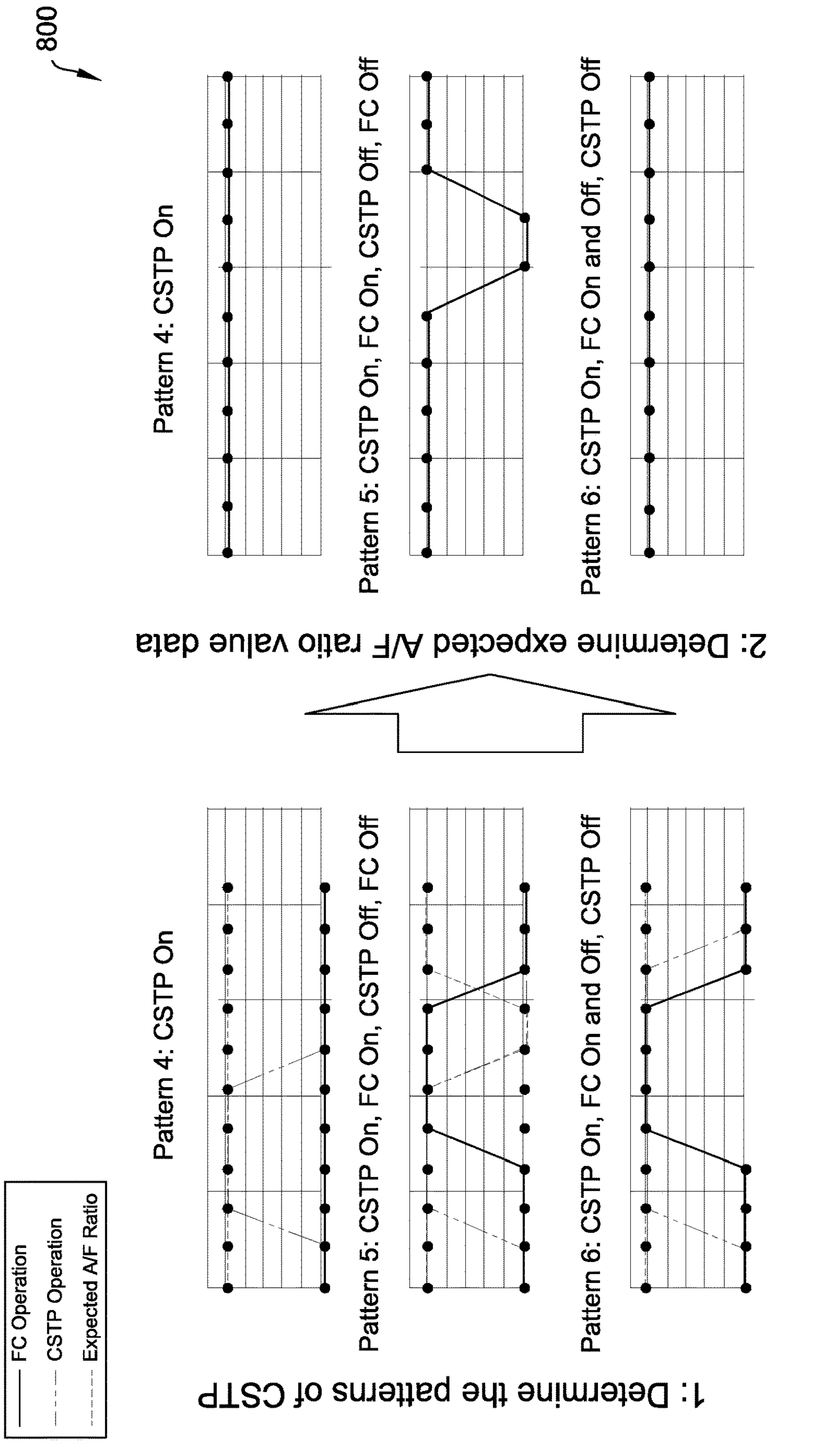

In the example embodiment illustrated in FIG. 7, the three different cylinder operating states can be modeled into at least six different patterns of cylinder operating states, for example, based upon the different possible sequences of cylinder-on, fuel-cut, and cylinder-stop operating states, as shown in FIGS. 8A and 8B. More specifically, FIGS. 8A and 8B schematically illustrate a flow diagram 800 of a process that may be used (e.g., by ECU 102) to determine expected air-to-fuel ratio value data detected by LAF sensor 302A based on past or historical sequences of cylinder operating states.

The flow diagrams in FIGS. 8A and 8B depict six different patterns of fuel-cut and cylinder-stop operating states on time plots in the left-hand column. Each plot includes a line depicting the fuel-cut state ("FC Operation") and a line depicting the cylinder-stop state ("CSTP Operation"), wherein a low value indicates the associated state or operation is off and a high value indicates the associated state or operation is on. By way of example, Pattern 1 illustrates a sequence where a cylinder transitions from a cylinder-on state to a fuel-cut state (shown by the FC Operation line transitioning from a low to high value), and then back to a cylinder-on state (shown by the FC Operation line transitioning from a high to low value). Additionally, each plot includes a line depicting the expected air-to-fuel ratio detected by the LAF sensor 302A ("Expected A/F Ratio") for the illustrated pattern of cylinder operating states. By way of example, referring again to Pattern 1, the expected air-to-fuel ratio detected by the LAF sensor transitions from a high value to a low value when the cylinder transitions to the fuel-cut state because the cylinder is no longer exhausting combusted gases.

The transition of the CATFR signal 502 illustrated in FIG. 5 can correspond to a cylinder transitioning from a CSTP On state to a CSTP Off state, which occurs in patterns 2, 3, 5, and 6. Pattern 6 is an illustrative example of a pattern in which previous systems may not accurately predict expected air-to-fuel ratio values of an engine when a cylinder transitions between different states and, consequently, control the engine in a less than optimal way. In this pattern, a cylinder sequentially transitions from a CSTP On state (i.e., valves closed, stagnant exhaust air trapped by LAF sensor), to a FC On state, to a FC Off state, and then to a CSTP Off state. Under this pattern or sequence, some prior systems were programmed under the assumption that, once the FC Operation was turned on, the exhaust air within the system was flushed and the expected air-to-fuel ratio detected by the LAF sensor would be all oxygen (or free of any fuel). However, because the CSTP Operation occurs prior to the FC Operation in pattern 6, the exhaust air within the system is not flushed (e.g., because the piston associated with the cylinder is disengaged from the vehicle's drivetrain and air flow through the cylinder is ceased). Consequently, prior systems would be programmed such that the expected air-to-fuel ratio detected by the LAF sensor would start from all oxygen (i.e., a low value) following a FC On then Off pattern (as in pattern 6), and the system would therefore command the air-to-fuel ratio to increase before sensing, through received sensor data from the LAF sensor, that the air-to-fuel ratio was already high. The ECU 102 of the systems disclosed herein can be configured to accurately command the air-to-fuel ratio following this type of pattern by accounting for the past or historical sequence of operating states of the cylinder. In particular, the ECU 102 can be programmed such that the expected air-to-fuel ratio detected by the LAF sensor (e.g., SATFR signal 508) following the FC On then Off pattern would be high (i.e., a mix of fuel and oxygen) because the CSTP Operation occurred prior to the FC On then Off pattern, and the ECU 102 would know that stagnant exhaust gas was not flushed. This has the effect of reducing the FBCV signal 506 which, as described above, can be used by ECU 102 to issue operation command signals to cylinders of the engine, and thereby facilitate reducing fluctuations in the air-to-fuel ratio of exhaust gases of the engine. As discussed herein, reduced fluctuations in the air-to-fuel ratio of engine exhaust gases results in better utilization of precious metals in catalytic converters, and can thereby facilitate reducing the precious metal content within catalytic converters.

The different patterns or sequences of cylinder operating states and the associated expected air-to-fuel ratio values detected by the LAF sensor may be stored (e.g., in non-volatile memory 204 or volatile memory 206) and used by the ECU 102 to control operation of the vehicle engine 108. In the exemplary process, for example, the ECU 102 can determine the pattern or sequence of operating states for one or more of the system's cylinders 602. In some embodiments, for example, the ECU 102 may store (e.g., in non-volatile memory 204 or volatile memory 206) a sequence of current operating states of one or more of the vehicle's cylinders during operation, for example, by persistently determining an operating state of each cylinder and storing (e.g., in non-volatile memory 204 or volatile memory 206) the determined operating state of each of the one or more cylinders. The ECU 102 can then determine expected air-to-fuel ratio value data for the stored sequence of operating states, and use the determined expected air-to-fuel ratio value data to control the fuel injector associated with the cylinder(s), as described above with reference to FIG. 5. For example, the ECU 102 can compare the stored sequence of cylinder operating states to the pre-determined sequences or patterns, shown in FIGS. 8A and 8B, and determine the expected air-to-fuel ratio value data for the stored sequence of cylinder operating states. The ECU 102 may then use the determined expected air-to-fuel ratio value data to control operation of the engine's fuel injectors. For example, the ECU 102 may use the determined expected air-to-fuel ratio value data to determine or model the SATFR signal 508 (shown in FIG. 5), and determine a difference between the expected air-to-fuel ratio value data (SATFR signal 508) and the actual air-to-fuel ratio value data (ATFR signal 504). The ECU 102 can then control operation of the fuel injector(s) based on the determined difference.

In addition, the ECU 102 may further determine the expected air-to-fuel ratio value data based on an expected time delay associated with exhaust gas from the cylinder 602 reaching the LAF sensor 302A, also referred to herein as a sensor response time constant. For example, when a cylinder transitions from a cylinder-stop state to a cylinder-on state, the change in the air-to-fuel ratio in the exhaust gas flow associated with the change in cylinder operating states may not be immediately detected by the LAF sensor because of gas transport delays and delays associated with re-engaging the cylinder with the vehicle's drivetrain (e.g., based on a position of the piston relative to the top dead center position of the cylinder). Referring to FIG. 5, for example, there is a delay between the CATFR signal 502 transitioning from the low to high value and the associated change in the air-to-fuel ratio (ATFR signal 504) detected by the LAF sensor 302A. In some embodiments, the ECU 102 may be configured to determine the expected time delay associated with exhaust gas from the cylinder 602 reaching the LAF sensor 302A following a transition from a cylinder-stop state and/or determine the expected air-to-fuel ratio value data (e.g., SATFR signal 508) based on the expected time delay.

In some embodiments, for example, the expected time delay is a dead time delay that includes an exhaust open delay component and a gas transport delay component. The exhaust open delay component refers to the amount of time between when the cylinder and/or associated fuel injectors are activated (e.g., following a cylinder-stop state) and when exhaust gas is exhausted or expelled from the cylinder. For example, the amount of time exhaust gases remain contained within the cylinder will depend, at least in part, on where the cylinder piston is at relative to the top dead center position. Thus, exhaust gases may take a longer or shorter amount of time to be expelled from the cylinder depending on where the cylinder piston is at relative to the top dead center position. The gas transport delay time refers to an amount of time between exhaust gases exiting the cylinder and reaching the LAF sensor. In other words, the gas transport delay time is a time delay associated with how long it takes exhaust gases to travel from the cylinder to the LAF sensor, which will depend, at least in part, on an operating speed (e.g., RPM) of the engine.

The exhaust open delay time and gas transport delay time can be determined (e.g., by ECU 102) based on known vehicle constraints and vehicle operating conditions (e.g., RPM). In some embodiments, the ECU 102 can be programmed to determine or calculate the dead time delay, for example, by determining the sum of the exhaust open delay time and the gas transport delay time. The ECU 102 can be further configured to determine or calculate each of the exhaust open delay time and the gas transport delay time based on known vehicle constraints, which may be stored in non-volatile memory 204 or volatile memory 206 of ECU 102 as constants, and vehicle or engine operating conditions (e.g., RPM), which may be determined or received by ECU 102 in real time or during operation of the engine.

Figure 9:
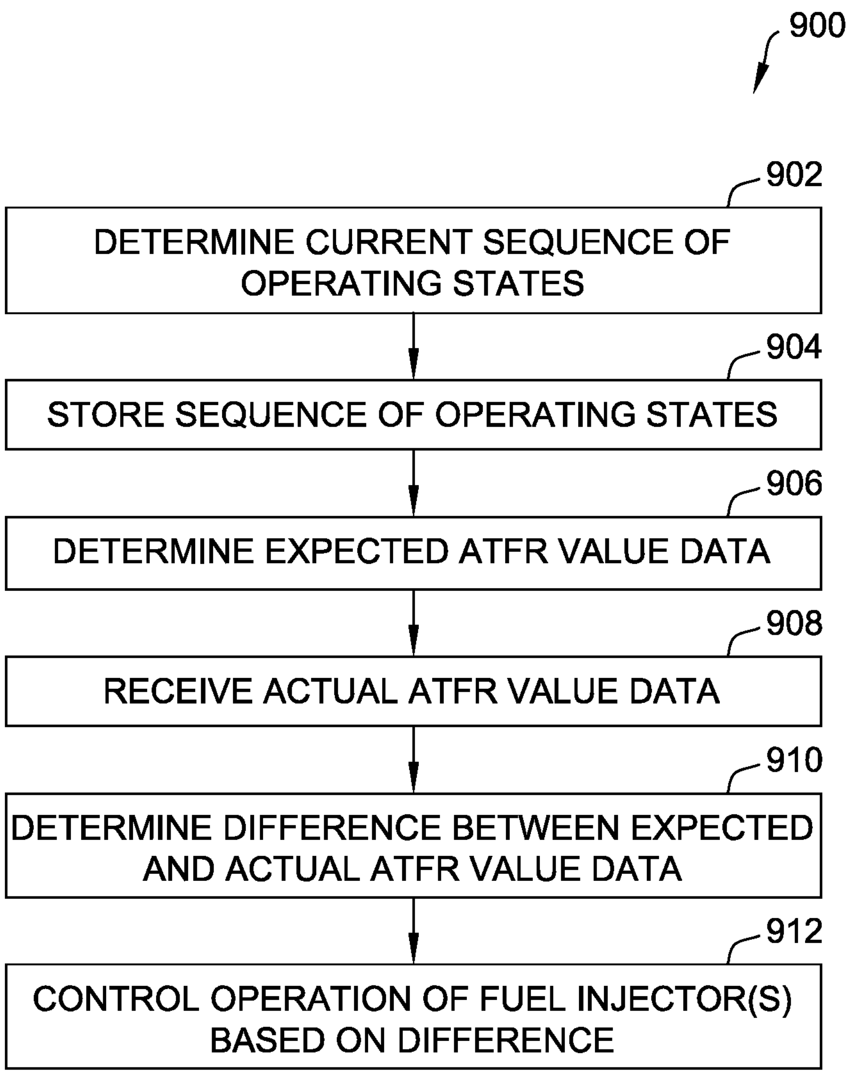
FIG. 9 is a flow diagram of an exemplary method of controlling a vehicle engine, such as the engine of the engine control system shown in FIG. 1.

FIG. 9 is a flow diagram of an exemplary method 900 of controlling a vehicle engine, such as engine 108 of the engine control system 100 shown in FIG. 1. Method 900 may be implemented or embodied, for example, on engine ECU 102. In this example, at least one fuel injector is associated with each of the one or more cylinders, such as fuel injector 610 of cylinder 602 (shown in FIG. 6). In the exemplary method, engine ECU 102 determines 902 a current sequence of operating states of one or more of the engine cylinders, and stores 904 the sequence of operating states (e.g., in non-volatile memory 204 or volatile memory 206). For example, the ECU 102 may be configured to continuously or persistently monitor and/or determine the operating state of each of the engine's cylinders, and store the determined operating state of each cylinder. The engine ECU 102 then determines 906, based on the stored sequence of operating states, expected air-to-fuel ratio (ATFR) value data (e.g., SATFR shown in FIG. 5) that will be detected by a sensor of the control system 100 (e.g., LAF sensor 302A). As described above, for example, the engine ECU 102 may compare the stored sequence of operating states from step 904 to known sequences of cylinder operating states and associated expected air-to-fuel ratio values (shown in FIGS. 8A and 8B, for example), and determine 906 the expected ATFR value data based on the comparison. Additionally or alternatively, the ECU 102 may use a look-up table or similar process to identify expected ATFR value data based on pre-stored sequences of cylinder operating states. The ECU 102 may be further configured to determine 906 the expected ATFR value data based on a time delay associated with the exhaust gas reaching a sensor (e.g., LAF sensor 302A, shown in FIG. 3) of the control system 100. As described above, for example, the ECU 102 can be configured to calculate the time delay by determining the sum of an exhaust open delay time and a gas transport delay time.

The engine ECU 102 further receives 908 actual ATFR value data from at least one sensor of the control system 100 (e.g., LAF sensor 302A). Actual ATFR value data may be measured, for example, by a sensor of the vehicle's exhaust system, such as sensor 112 of exhaust system 110 shown in FIG. 1. In some embodiments, the at least one sensor is a linear air-to-fuel (LAF) ratio sensor, such as LAF sensor 302A shown in FIG. 3. In the exemplary method 900, engine ECU 102 determines 910 a difference between the expected and actual ATFR value data and, based on this determined difference, controls 912 operation of at least one fuel injector of the cylinder(s), for example, to 1) reduce actual ATFR data value to the target value (e.g., SATFR), 2) compensate for cylinder-stop operation, and/or 3) compensate for stagnated exhaust gases. For example, the engine ECU 102 may control the at least one fuel injector by adjusting or modulating one or more operating parameters of the engine's fuel injectors to deliver more or less fuel to the cylinder based on the determined difference between the expected and actual ATFR value data. Suitable fuel injector operating parameters that can be adjusted or modulated include, for example and without limitation, an actuation frequency of the fuel injector, an open time of the fuel injector, an open position of the fuel injector, and combinations thereof.

In some embodiments, the engine ECU may be configured to actively, or persistently, monitor the operating state of the vehicle's engine. For example, engine ECU may, while the engine is running, continuously monitor the operating state of one or more of the engine's cylinders (e.g., determine patterns of CSTP) and repeat the steps described above in FIG. 9 to control one or more cylinders of the engine to reduce actual ATFR data values to the expected ATFR data values. If the engine is running, the engine ECU will continuously seek to reduce actual ATFR to an expected ATFR to achieve an emission standard for the vehicle and minimize the correction value FBCV, as shown in FIG. 5.

Example technical effects of the methods, systems, and apparatus described herein include at least one of: (a) reduction of harmful emissions; (b) achieving lower emissions without increasing precious metal mass of catalytic converters; (c) accurate compensation of an engine for cylinder stop operation; and (d) unique control of engine to compensate for stagnated exhaust gases resulting from cylinder stop operations.

Some embodiments involve the use of one or more electronic processing or computing devices. Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one embodiment" of the present disclosure or "an example embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for a vehicle, the control system comprising:

- an engine comprising one or more cylinders, each of the one or more cylinders including at least one fuel injector associated therewith;
- a vehicle exhaust system coupled in fluid communication with the engine for receiving exhaust gas therefrom;
- at least one sensor coupled to the vehicle exhaust system to detect an air-to-fuel ratio of the exhaust gas; and
- an engine electronic control unit (ECU) communicatively coupled to the at least one sensor and the at least one fuel injector of each cylinder, the ECU comprising memory and at least one processor, wherein the ECU is configured to:
- store a plurality of patterns each including a sequence of operating states of the one or more cylinders;
- receive one or more signals about current operation the engine;
- determine a sequence of recent operating states based upon the one or more signals about the current operation of the engine;
- compare the sequence of recent operating states to the plurality of patterns to determine a current operating state for the engine;
- determine, based on the current operating state, expected air-to-fuel ratio (ATFR) value data;
- receive, from the at least one sensor, actual air-to-fuel ratio (ATFR) value data;
- determine a difference between the expected and actual ATFR value data; and
- control operation of the at least one fuel injector based on the determined difference.

2. The control system of claim 1, wherein the ECU is configured to store the sequence of operating states of the one or more cylinders by:

- persistently determining an operating state of each of the one or more cylinders; and
- storing the determined operating state of each of the one or more cylinders.

3. The control system of claim 2, wherein the ECU is configured to determine that each of the one or more cylinders is in one of a cylinder-on state, a fuel-cut state, and a cylinder-stop state.

4. The control system of claim 1, wherein the ECU is further configured to determine the expected ATFR value data based on a time delay associated with the exhaust gas reaching the at least one sensor.

5. The control system of claim 4, wherein the ECU is further configured to calculate the time delay by determining the sum of an exhaust open delay time and a gas transport delay time, wherein the exhaust open delay time is an amount of time between the at least one fuel injector being activated and exhaust gas exiting the associated cylinder, and wherein the gas transport delay time is an amount of time between exhaust exiting the one or more cylinders and reaching the at least one sensor.

6. The control system of claim 1, wherein the stored sequence of operating states includes a cylinder-stop state for at least one of the one or more cylinders.

7. The control system of claim 1, wherein the at least one sensor comprises a linear air-to-fuel ratio sensor.

8. The control system of claim 1, wherein the engine includes a plurality of cylinder banks, each of the cylinder banks including a plurality of cylinders, wherein the plurality of cylinders of each cylinder bank is operable in an operating state independent of the operating state of the plurality of cylinders of the other of the plurality of cylinder banks.

9. The control system of claim 8, wherein the engine is a six-cylinder engine, and wherein the plurality of cylinder banks includes two-cylinder banks, each including three cylinders.

10. A method of controlling a vehicle engine including one or more cylinders, each of the one or more cylinders including at least one fuel injector associated therewith, said method comprising:

- storing, in a memory of an engine electronic control unit (ECU), a plurality of patterns each including a sequence of operating states of the one or more cylinders;
- receiving one or more signals about current operation the engine;
- determining a sequence of recent operating states based upon the one or more signals about the current operation of the engine;
- comparing the sequence of recent operating states to the plurality of patterns to determine a current operating state for the engine:
- determining, by the ECU, based on the current operating state, expected air-to-fuel ratio (ATFR) value data;
- receiving, at the ECU, actual air-to-fuel ratio (ATFR) value data from at least one sensor of an exhaust system of the vehicle;
- determining, by the ECU, a difference between the expected and actual ATFR value data; and
- controlling operation of the at least one fuel injector based on the determined difference.

11. The method of claim 10, wherein storing the sequence of operating states includes:

- persistently determining, by the ECU, an operating state of each of the one or more cylinders; and
- storing, in the memory of the ECU, the determined operating state of each of the one or more cylinders.

12. The method of claim 10 further comprising determining that each of the one or more cylinders is in one of a cylinder-on state, a fuel-cut state, and a cylinder-stop state.

13. The method of claim 10, wherein determining, by the ECU, expected ATFR value data comprises determining the expected ATFR value data based on a time delay associated with exhaust gas expelled from the one or more cylinders reaching the at least one sensor.

14. The method of claim 13, further comprising calculating the time delay by determining the sum of an exhaust open delay time and a gas transport delay time, wherein the exhaust open delay time is an amount of time between the at least one fuel injector being activated and exhaust gas exiting the associated cylinder, and wherein the gas transport delay time is an amount of time between exhaust exiting the one or more cylinders and reaching the at least one sensor.

15. The method of claim 10, wherein the stored sequence of operating states includes a cylinder-stop state for at least one of the one or more cylinders.

16. The method of claim 10, wherein the at least one sensor comprises a linear air-to-fuel ratio sensor.

17. An engine electronic control unit (ECU) comprising memory and at least one processor, the memory having computer-executable instructions embodied thereon which, when executed by the at least one processor, cause the at least one processor to:

store a plurality of patterns each including a sequence of operating states of one or more cylinders of an engine, wherein each of the one or more cylinders includes at least one fuel injector associated therewith;

receive one or more signals about current operation the engine;

determine a sequence of recent operating states based upon the one or more signals about the current operation of the engine;

compare the sequence of recent operating states to the plurality of patterns to determine a current operating state for the engine:

determine, based on the current operating state, expected air-to-fuel ratio (ATFR) value data;

receive, from at least one sensor of a vehicle exhaust system, actual air-to-fuel ratio (ATFR) value data;

determine a difference between the expected and actual ATFR value data; and control operation of the at least one fuel injector based on the determined difference.

18. The engine ECU of claim 17, wherein the instructions further cause the processor to store the sequence of operating states of the one or more cylinders by:

persistently determining an operating state of each of the one or more cylinders; and storing the determined operating state of each of the one or more cylinders.

19. The engine ECU of claim 18, wherein the instructions further cause the processor to determine that each of the one or more cylinders is in one of a cylinder-on state, a fuel-cut state, and a cylinder-stop state.

20. The engine ECU of claim 17, wherein the instructions further cause the processor to determine the expected ATFR value data based on a time delay associated with exhaust gas reaching the at least one sensor.

* * * * *